UNITED STATES PATENT OFFICE.

FLOYD W. ROBISON, OF DETROIT, MICHIGAN, ASSIGNOR TO FLOYD W. ROBISON COMPANY, OF DETROIT, MICHIGAN, A CORPORATION OF MICHIGAN.

PROCESS OF TREATING COFFEE.

1,313,209.      Specification of Letters Patent.      Patented Aug. 12, 1919.

No Drawing.      Application filed October 24, 1917. Serial No. 198,335.

*To all whom it may concern:*

Be it known that I, FLOYD W. ROBISON, a citizen of the United States, residing at Detroit, State of Michigan, have invented a certain new and useful Process of Treating Coffee, of which the following is a specification.

This invention pertains to the treatment of coffee with a view to improving the flavor and palatability of the beverage ultimately produced from the treated and subsequently roasted coffee.

I have discovered, and determined by experimentation, that coffee, preferably in the so-called green or unroasted condition, can be inoculated and living micro-organisms propagated thereon so as to produce a coffee which, when roasted subsequently to the period of incubation, will be found to possess certain improved characteristics.

A culture suitable for the purpose is prepared by growing micro-organisms and particularly that class of micro-organisms known as molds, upon suitable nutrient media.

Having prepared the culture, it is desirable now with a view to obtaining a good effect to prepare the coffee for the subsequent propagation. I proceed by spraying or moistening the coffee with water, preferably warm water, or by gently treating with live steam, the effect of which is to cause the coffee berries to swell and become soft, thus resulting in placing the coffee in a condition suitable for the growth of the micro-organisms. At this state of treatment it is not desirable to soak the green berries in water, nor to carry the treatment to a point which results in germination, but for the purposes I have in view I have found it to be sufficient to employ only enough water to swell and soften the berries.

Having prepared the coffee as above, it is now in condition for inoculation. It is desirable at this stage to maintain a more or less uniform condition of temperature and moisture. A desirable temperature is from 25 degrees to 30 degrees centigrade, and the moisture condition is such that the coffee will not dry out while under incubation. To this end, it is desirable that the preparation of coffee, and the inoculation and incubation treatment, be performed in a room or chamber through which air is not permitted to circulate freely.

The inoculation is performed as follows: The culture of micro-organisms, from one of the sources herebefore described, is now brought into contact with the softened coffee by sprinkling, spraying or otherwise, and it is now desirable to thoroughly mix the coffee and the culture together with a view to facilitating the work of the micro-organisms. The coffee is placed in heaps or spread within the closed chamber to the depth of a foot, or thereabout, and closely covered to the exclusion of currents of air and to preserve the desirable incubation conditions. The material is allowed to rest for a period of two or three days, at the end of which time the material is examined with a view to ascertaining the progress of the incubation treatment. Assuming that it is sufficiently developed, I now proceed to agitate the mass with a view to remixing it in order to bring about as complete uniformity of incubation treatment as is possible to obtain. The mass is then again covered, and the incubation treatment allowed to proceed for a few days longer, or until the coffee shall have developed to the point necessary to produce the result desired in the subsequently roasted product. At this stage an examination of the coffee will show an active growth of micro-organisms, and particularly those known as molds, throughout the mass. When the desired point is reached, it is essential that the further growth of micro-organisms be arrested, otherwise a rapid deterioration of the coffee takes place. This growth or incubation may be arrested either by roasting the coffee at once, or by spreading it out and drying it, and subsequently roasting it.

Coffee produced as herein described is superior to such coffee before treatment from the standpoint of flavor, aroma, keeping qualities after being ground or brewed, or both, and general drinking properties. Likewise, coffee produced as herein described is superior to the coffee before treatment in that it contains a decidedly increased quantity of soluble constituents, thereby materially increasing the body of the resulting beverage.

A culture suitable for the purpose is or may be prepared from a carefully selected coffee, as follows:—A few of the berries are placed in a suitable receptacle with sterile water and shaken together to impart to the water the micro-organisms existing on the coffee. This liquid culture is then transferred to nutrient agar plates by customary laboratory methods. These are then allowed to incubate and sub-cultures taken to prepare the commercial cultures.

Although I have described a culture of micro-organisms which I have found by experiment to be well adapted for the purpose in view, and have described one mode of preparing such culture, I would have it understood that my invention is not restricted to the use of the particular culture specified, nor to the use of a culture prepared as set forth. Contrariwise, I hold myself at liberty to employ any single strain of living micro-organism, or any culture of living micro-organisms, which may be found to be suitable for the purpose of inoculating and incubating coffee to obtain the desirable results herein specified.

I recognize the fact that micro-organisms may and do exist in a more or less dormant condition in practically all green coffees, but the conditions surrounding such coffee may not be or are not favorable to the development of such micro-organisms. Therefore, it is a part of this invention that such coffee shall be brought into a condition which will effectuate the propagation of such micro-organisms on the coffee. Accordingly in coffees of this class I have found it necessary to soften the coffee by moistening the same so as to render active the micro-organisms, and to establish the desired temperature suitable for the incubation of the micro-organism as heretofore described and for the purposes specified.

For a certain desired change in or improvement of coffee, it may be and is desirable to inoculate coffee with, or cause the development in coffee of, a certain definite micro-organism, or a definite strain of micro-organisms.

It may be desired in the above described preliminary treatment of coffee to extend the act of steaming the green berry to a point where the coffee is rendered sterile, and this has the effect of placing the coffee in such condition that the subsequent inoculation will proceed more directly along certain definite lines. This sterilization may be effected by other means than direct steaming, as e. g. dry heating, in which event it becomes necessary to subsequently moisten the coffee prior to inoculation.

I claim:

1. In the art of treating coffee, the process which consists in placing the coffee in a condition suitable for mold growth, permitting a mold growth to attain a condition desired, and arresting further mold development.

2. In the art of treating coffee, the process which consists in placing coffee in a condition suitable for mold growth, propagating a selected mold growth to attain a desired condition, and arresting further mold development.

3. In the art of treating coffee, the process which consists in moistening coffee to soften the same, and propagating a mold on the coffee until a desired condition is attained.

4. In the art of treating coffee, the process which consists in propagating molds on coffee under treatment, and subsequently drying the treated coffee to arrest further mold development.

5. In the art of treating coffee, the process which consists in moistening coffee to soften the same, propagating molds on the softened coffee, and subsequently drying the treated coffee to arrest further development of the mold.

6. In the art of treating coffee, the process which consists in sterilizing coffee, placing coffee in a condition suitable for mold growth, permitting mold growth to attain a desired condition, and then arresting further mold development.

7. In the art of treating coffee, the process which consists in propagating living micro-organisms on green coffee for such a period of time as will render soluble certain of the insoluble constituents of the coffee under treatment.

8. In the art of treating coffee, the process which consists in propagating molds on the coffee under treatment.

9. As a new article, coffee having its soluble constituents increased by the propagation of living micro-organisms thereon.

10. As a new article, coffee having its soluble constituents increased by the propagation of molds thereon.

11. As a new article, coffee having living micro-organisms propagated thereon and the development of which is arrested when the coffee attains a desired condition.

12. As a new article, coffee having its soluble constituents increased and its flavor enhanced by the propagation of molds thereon, and the development of which molds is arrested when the coffee has attained a desired condition.

FLOYD W. ROBISON.